J. M. HANSEN.
APPARATUS FOR THE MANUFACTURE OF SPOKED WHEELS.
APPLICATION FILED OCT. 7, 1911.
1,191,591.
Patented July 18, 1916.
2 SHEETS—SHEET 1.
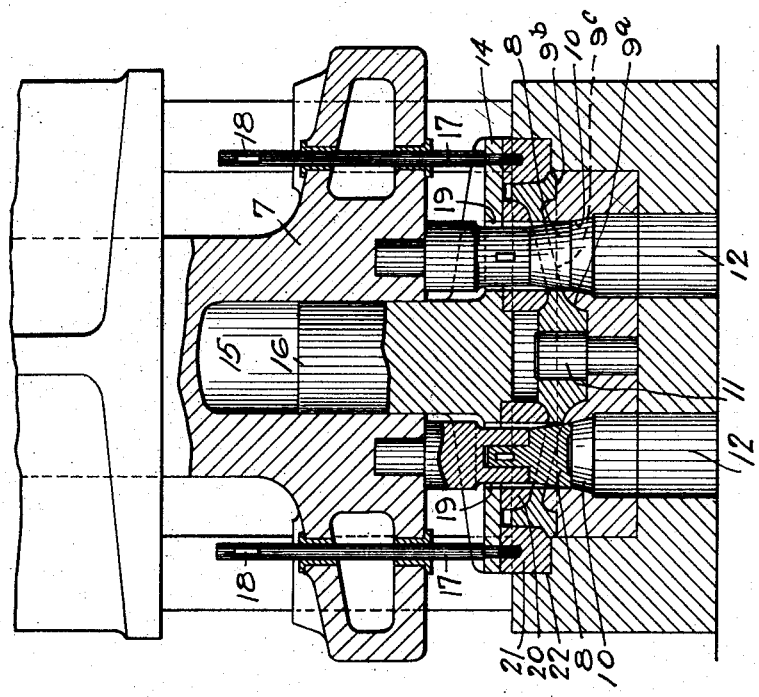
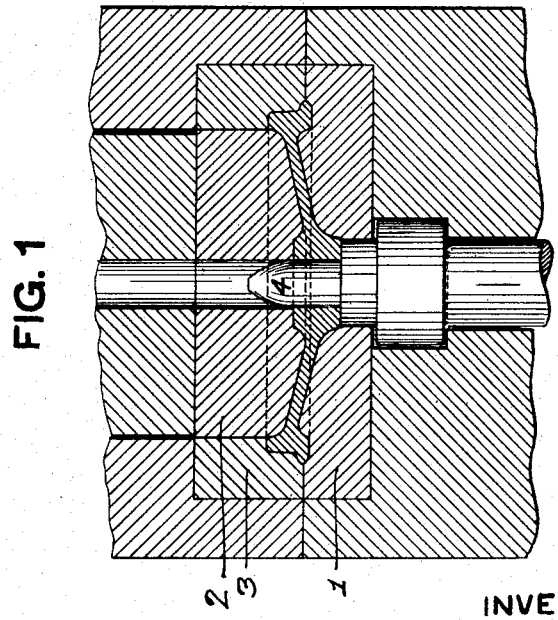
WITNESSES.
INVENTOR.

J. M. HANSEN.
APPARATUS FOR THE MANUFACTURE OF SPOKED WHEELS.
APPLICATION FILED OCT. 7, 1911.
1,191,591.
Patented July 18, 1916.
2 SHEETS—SHEET 2.
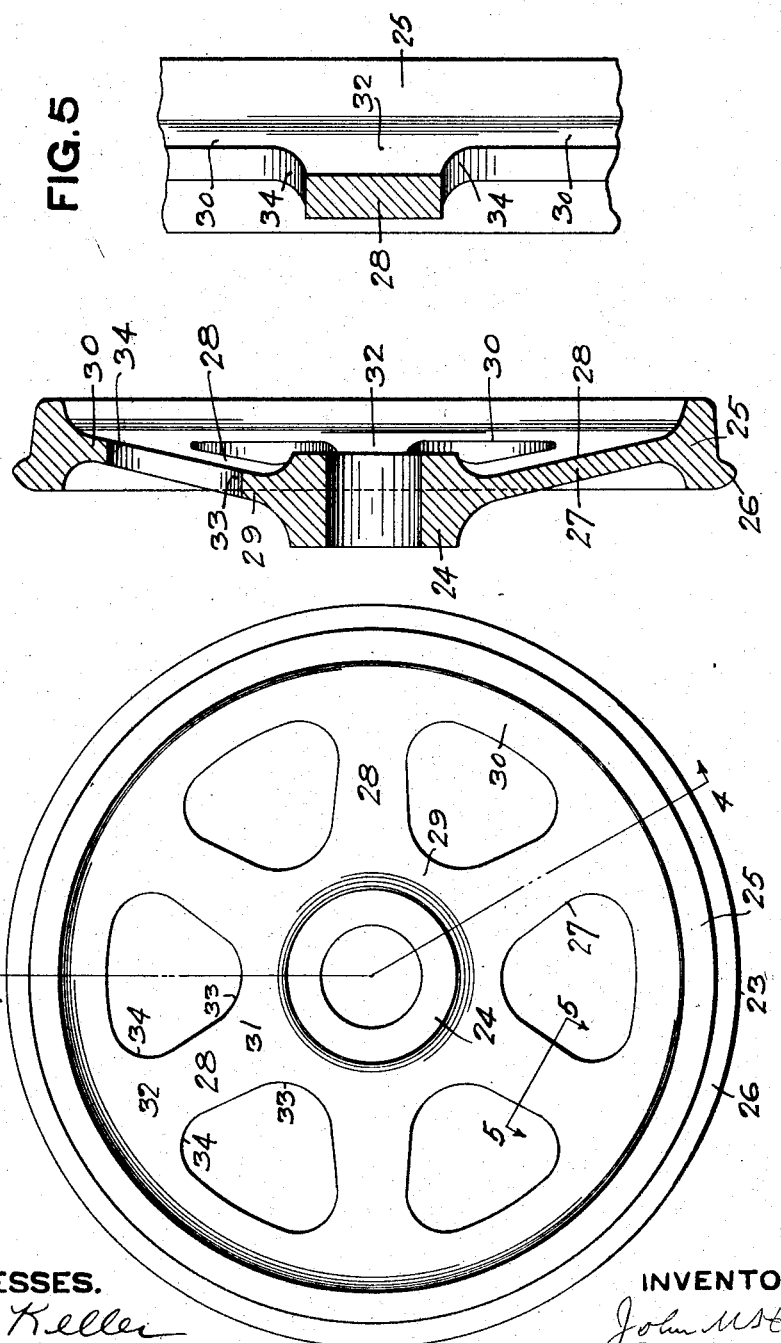
WITNESSES.
INVENTOR.

UNITED STATES PATENT OFFICE.

JOHN M. HANSEN, OF PITTSBURGH, PENNSYLVANIA, ASSIGNOR TO FORGED STEEL WHEEL COMPANY, OF PITTSBURGH, PENNSYLVANIA, A CORPORATION OF PENNSYLVANIA.

APPARATUS FOR THE MANUFACTURE OF SPOKED WHEELS.

1,191,591.        Specification of Letters Patent.        Patented July 18, 1916.

Application filed October 7, 1911. Serial No. 653,433.

*To all whom it may concern:*

Be it known that I, JOHN M. HANSEN, a citizen of the United States, and resident of Pittsburgh, in the county of Allegheny and State of Pennsylvania, have invented a new and useful Improvement in Apparatus for the Manufacture of Spoked Wheels; and I do hereby declare the following to be a full, clear, and exact description thereof.

My invention relates to the apparatus for the manufacture of steel spoked wheels, for example light forged steel car wheels. It is very desirable for some classes of car wheels, such as those carrying relatively light loads as in electric service, to provide a relatively light weight forged steel wheel because of the greater strength in this class of wheels to resist shocks and jars, as any material reduction in weight produces a like economy in cost of running. For this class of car wheels it has been found that a one-wear wheel, namely, a wheel with a light hub and rim but with sufficient thickness of flange, is very desirable, and great difficulty has been experienced in providing such a wheel with a light weight web of sufficient stiffness. One main reason for this is found in the difficulty of forging an even light web corresponding to the usual proportions of the wheel body, because the metal of the web is forged much thinner than the hub and rim, and is subjected to very considerably more work, and, being thinner than the hub and rim, the web portion cools more rapidly in the forging operation and becomes too stiff for forging if made much thinner than in the standard heavy wheel used for steam railroad service. Another difficulty found is that where the wheel web is thinned in like proportion to the rest of the wheel as compared with the regular section of such heavier forged steel wheel, and the wheel is dished, the web strength and stiffness of the wheel are also impaired so as to be brought below the safety limit for wheels of this type. By the present invention I provide means for making wheels with a light-weight mid-section connecting the hub and rim and yet with sufficient stiffness to sustain the desired load. It relates particularly to the means for shearing the web portion of the forged wheel so as to provide an integral spoked wheel with sufficient thickness of spoked portion to give the required stiffness and strength to the wheel.

It consists, generally stated, in the combination with a bottom or anvil shearing die having a supporting face corresponding to the shape of the wheel and suitable shearing openings with a reciprocating die head carrying a series of shears by which at a single stroke portions of the web of the wheel may be sheared therefrom so forming a series of spokes connecting the hub and rim. It also comprises a reciprocating clamping head adapted to clamp the web of the wheel to the outer face of the rim or tread so as to hold it to shape during the shearing operation, thus making it practicable to shear the wheel immediately after it is forged to shape and to hold it to the proper dished shape during the shearing operation.

In the accompanying drawings Figure 1 is a vertical section with a series of dies suitable for forging the wheel; Fig. 2 is a like vertical section of the shearing dies embodying the invention; Fig. 3 is a face view of the finished wheel; Fig. 4 is a vertical section of the wheel on the line 4—4 Fig. 3; and Fig. 5 is a detail section on the line 5—5 Fig. 3.

In the manufacture of the wheel any suitable means may be employed, the wheels being made either by a forging or a rolling operation, or a combination of the two as found desirable. In Fig. 1 I have illustrated the forging dies suitable for this purpose, said dies having the anvil die 1, the reciprocating forging die 2, the ring die 3 and the punch 4. The dies as illustrated can be used either as one-operation dies, producing the wheel from the blank by one forging operation, at the same time dishing the wheel, drawing the hub out of line with the rim, or may be used as finishing dies for the final forging operation.

In Fig. 2 I have illustrated the dies embodying the present invention, these dies having the reciprocating die head 7 carrying the series of shears 8, the anvil die 9. The supporting surface of this anvil die is of proper contour for the supporting of the wheel, being illustrated as having a hub seat 9ª, and rim seat 9ᵇ and a web seat 9ᶜ, the hub being illustrated as out of line with the rim and the web seat being inclined according to the dish imparted to the wheel. The anvil die has also the shearing openings 10 corresponding to the shears 8 and it has also a central supporting mandrel 11 which enters within the axle opening formed in the wheel and centers the wheel upon the anvil die and sustains the hub of the wheel in such way as to prevent its deformation during the shearing operation. The shearing openings are illustrated with suitable clearance 12 for the dropping of the metal removed from the web of the wheel. To properly sustain the heated wheel during the shearing operation I provide a clamping head 14 which is carried in the reciprocating head 7, that head having a central pressure cylinder 15 in which the plunger 16 of the clamping head 14 slides. The clamping head can be raised by suitable means such as the bars 17 connected thereto and extending upwardly through openings in the reciprocating head 7 and having cotters 18 near their upper ends which are engaged by the reciprocating head and so lift the clamping head. The clamping head 14 has suitable openings 19 for the passage of the shears 8 and carries the clamping face 20 corresponding in shape to the upper face of the wheel web and the curved faces of the hub and rim, so providing for the positive clamping of the wheel during the shearing of the web portion of the wheel. In order to properly brace the wheel rim during such shearing operation I also prefer to provide on the clamping head the ring die 21 fitting against the outer face of the rim or tire of the wheel and sustaining it against possible deformation during the shearing operation. This ring 21 fits into the seat 22 formed in the anvil die 9 and confines the outer face of the wheel rim during shearing. The clamping head is preferably forced downwardly by hydraulic pressure.

In the use of the apparatus for the manufacture of car wheels, the wheel is forged to shape in any suitable way and is preferably sheared while still in heated condition. In this way I am enabled to produce the wheel 23 with the finished hub 24, rim 25, flange 26 and dished web portion 27. The wheel blank can be easily formed, the hub and rim of light weight and the web of sufficient thickness relative to hub and rim to provide the necessary stiffness in the finished spoked wheel with the desired lightness of weight caused by the shearing out of the web. In the preferred manufacture of light car wheels the web is made at least three-fourths of an inch thick near the rim and one inch thick near the hub. In such forging operation the wheel is dished so that the web portion is inclined instead of horizontal when resting upon the shearing die. While the wheel is still at a relatively high heat it is placed upon the anvil 9 which properly supports the same over its entire lower surface as above described and by the forcing down of the die head 7 by hydraulic pressure the several shears 8 simultaneously operate upon the web portion of the wheel body, shearing out large portions of the web at different points so as to produce the spokes 28. The shears pass through the web portion 27 on lines parallel to the wheel axis so that by one operation of the shearing dies the metal can be removed simultaneously at different points so as to produce the several spokes connecting the hub and rim. By this shearing operation, in operating upon dished car wheels, the shears first engage with the dished web portion of the wheel near the outer portion of the web and pass through the web along inclined lines, so providing for a clean cutting along gradual lines through the inclined or dished web portion of the wheel, thus providing for a clean shearing cut through the web portion with dies moving parallel to the axis of the wheel and having cutting edges which have horizontal faces at right angles to such axis. For some sizes of wheel and thickness of rim it is also desirable to suitably brace the upper face of the wheel and confine the hub and rim face and in such cases by means of the clamping head 14 with its web clamping face 20 and its rim clamping die 21 I am enabled to hold the heated wheel to exact shape during the shearing operation, preventing any possible deformation of the wheel in shearing. The die head 7 and clamping head 14 can then be raised and the finished wheel be withdrawn from the press.

In the formation of the wheel by the apparatus above described I prefer to leave the narrow continuous web portion 29 extending beyond the hub and the like web portion 30 near the rim, the metal as removed leaving such web portions of spokes 28 connecting the same, said spokes being wider close to the hub, as at 31, and close to the rim, as at 32, connecting to the hub and rim by curved lines as at 33, 34. In such construction while a large portion of the metal of the web, approximately one-half, is removed, I provide flat faced spokes with sheared edge faces or shear-finished edge walls parallel with the wheel axis, together with widened and thickened portions connecting these spokes to the wheel rim and hub. The shear-finished edge walls as so formed are made parallel to the axis and I am enabled to accomplish this by a single stroke of the die head so that it is possible to rapidly produce the wheels by first forging them to shape and while still in heated condition, transferring them to the shearing dies and subjecting them to the shearing stroke. This shearing stroke is made relatively easy in the shearing of dished car wheels by providing for the engagement of the shears near the outer portion of the web so that the shears act progressively through the metal of the web and the necessity of dies of great power for such purpose is overcome. By simultaneously shearing through the web at different points to produce the spokes the shearing at all points is accomplished while the metal of the web is at practically the same temperature throughout, and I thus avoid setting up strains in the wheel body. By means of the apparatus I am enabled to produce wheels having thick spokes integral with the hub and rim, such spokes having flat faces and shear edges, the spokes portion between the hub and rim being reduced approximately one-half in weight while having all the necessary strength and stiffness to sustain the weight to which this class of wheels is subjected. The wheels can be rapidly produced and at relatively low cost.

What I claim is:

1. In wheel shearing apparatus, the combination of a bottom die having a supporting face corresponding in contour to the wheel face and having shearing openings in said face in line with the wheel web, a die head reciprocating parallel to the axis of the wheel and provided with shearing dies in line with said shearing openings, and a reciprocating clamping head having a rim clamping ring fitting around the rim face of the wheel to prevent distortion of the wheel during the shearing operation.

2. In wheel shearing apparatus, the combination of a bottom die having a supporting face corresponding in contour to the wheel face and having shearing openings in said face in line with the wheel web, a die head reciprocating parallel to the axis of the wheel and provided with shearing dies in line with said shearing openings, a reciprocating clamping head having a rim clamping ring fitting around the rim face of the wheel, and a hub clamping face engaging with the hub portion of the wheel whereby the wheel is rigidly held against radial distortion.

3. In wheel shearing apparatus, the combination of a bottom die having a supporting face corresponding in contour to the wheel face and having shearing openings in said face in line with the wheel web, a die head reciprocating parallel to the axis of the wheel and provided with shearing dies in line with said shearing openings, and a clamping head having a web clamping face corresponding to and engaging with the web of the wheel and having shearing openings for the passage of the shears and a clamping ring engaging with the rim face of the wheel to prevent distortion of the wheel.

In testimony whereof, I, the said JOHN M. HANSEN, have hereunto set my hand.

JOHN M. HANSEN.

Witnesses:
ROBERT C. TOTTEN,
JOHN F. WILL.

Copies of this patent may be obtained for five cents each, by addressing the "Commissioner of Patents, Washington, D. C."